United States Patent
Kriksunov (10) Patent No.: US 7,267,869 B2
(45) Date of Patent: Sep. 11, 2007

(54) CONDUCTIVE CORROSION-RESISTANT COATING

(76) Inventor: Leo Kriksunov, 5 Perry La., Ithaca, NY (US) 14850

( * ) Notice: Subject to any disclaimer, the term of this patent is extended or adjusted under 35 U.S.C. 154(b) by 257 days.

(21) Appl. No.: 10/900,542

(22) Filed: Jul. 28, 2004

(65) Prior Publication Data

US 2006/0021544 A1    Feb. 2, 2006

(51) Int. Cl.
*B32B 5/16* (2006.01)
*B05D 3/00* (2006.01)
*B05D 5/00* (2006.01)
*B05D 1/36* (2006.01)

(52) U.S. Cl. ............ 428/323; 428/328; 428/220; 428/332; 427/180; 427/190; 427/191; 427/198; 427/201

(58) Field of Classification Search .......... None
See application file for complete search history.

(56) References Cited

U.S. PATENT DOCUMENTS

| | | | |
|---|---|---|---|
| 4,425,382 A * | 1/1984 | Tajima | 427/203 |
| 4,985,316 A | 1/1991 | Bose | |
| 5,798,188 A | 8/1998 | Mukohyama | |
| RE37,284 E | 7/2001 | Li | |
| 6,372,376 B1 * | 4/2002 | Fronk et al. | 429/41 |
| 2002/0001743 A1 | 1/2002 | Davis | |
| 2003/0027028 A1 | 2/2003 | Davis | |
| 2003/0068523 A1 | 4/2003 | Kaneta | |
| 2004/0038111 A1 | 2/2004 | Eddy | |
| 2004/0081879 A1 | 4/2004 | Washima | |
| 2004/0106029 A1 | 6/2004 | Iqbal | |
| 2004/0110058 A1 | 6/2004 | Lee | |

\* cited by examiner

*Primary Examiner*—Sheeba Ahmed
(74) *Attorney, Agent, or Firm*—Leo B. Kriksunov (57) ABSTRACT

A conductive, corrosion-resistant coating includes a mixture of corrosion-resistant binder and highly conductive corrosion-resistant particles. The size of the particles is equal to or greater than the final thickness of the coating. After the coating is applied and cured, the surface of the coating is machined to remove the top surface layer of the binder as well as the top parts of the particles embedded in the binder, thus opening multiple direct conductive paths to the underlying substrate through the conductive particles.

20 Claims, 10 Drawing Sheets

PRIOR ART

FIG. 1

PRIOR ART

CONDUCTIVE CORROSION-RESISTANT COATING

FIELD OF THE INVENTION

This invention relates to conductive, corrosion-resistant coatings on a surface of conductive substrates, and in particular to corrosion-resistant coatings for use in bi-polar plates in fuel cells.

BACKGROUND OF THE INVENTION

Metallic bi-polar plates used in fuel cells are subject to corrosion. The reasons for corrosion are acidic environment, due to Polymer electrolyte membrane (PEM) leaching in PEM fuel cells; galvanic corrosion mechanism, due to galvanic coupling of dissimilar materials, especially graphite and metal; oxidizing or reducing environment; and elevated temperature in the fuel cell. This corrosion, combined with extremely long service times which are required in order to make fuel cells technically and commercially viable, prevents successful commercialization of the fuel cell technology. There is a need to develop bi-polar plates which can withstand an aggressive environment inside the fuel cell over a long period of time, at least 1-3 years and preferably more, are easily manufacturable, and are made of inexpensive materials.

The two main approaches to the materials selection for bi-polar plates are metallic bi-polar plates and graphite-based, or graphite composite-based, bi-polar plates.

The metallic bi-polar plates can be made of inherently corrosion-resistant materials such as titanium or titanium alloys. The main disadvantage of this approach is that these materials are very expensive and difficult to process during manufacturing. In addition, corrosion-resistant metals and alloys, such as titanium, tend to form thick non-conductive passive layers and thus increase the surface resistance of the metal, resulting in poor overall conductivity of the bi-polar plate and increased ohmic losses in the fuel cell. To overcome this problem, techniques preventing surface passivation can be used, such as noble metal deposition, or titanium surface modification or treatment, such as nitriding, to form non-passivating, conductive titanium nitride. These surface treatments are difficult to apply and are expensive.

Another type of metallic bi-polar plate is the plate made of corrosion-resistant material, such as stainless steel, but additionally protected from corrosion by anti-corrosion coatings. In this case, to diminish corrosion of the plate, the steel is coated with titanium nitride or plated with gold or other noble metal. These coatings are difficult to apply and are very expensive.

Yet another technique is electroplating the metallic bi-polar plate with a coating, such as chrome-based or nickel-based electroplated coating. These coatings are not able to withstand conditions in the fuel cell over extended periods of time, and eventually corrode.

Another type of coating which can be employed is conductive composite coating, or conductive paint, typically consisting of organic binder and fine conductive powder such as graphite or metal powder. These coatings have insufficient conductivity. This results in poor overall conductivity of the bi-polar plate and increased ohmic losses in the fuel cell. In order to increase conductivity of such coatings, the loading of the conductive powder should be as high as possible. However, this results in poor coating properties, such as very high viscosity, poor adhesion, susceptibility to delaminantion and cracking of the coating, poor thermal cycling resistance, and poor corrosion resistance. On the other hand, improving coating properties such as viscosity, adhesion, delaminantion, cracking, thermal cycling resistance, and anti-corrosive properties requires higher concentrations of the binder in the coating, which results in poor conductivity of the coating.

As an alternative to metallic bi-polar plates, graphite or graphite-based composites can be employed as materials for making bi-polar plates. Graphite exhibits good corrosion resistance in fuel cell environments. Graphite bi-polar plates are typically mechanically machined, whereas composite graphite/polymer plates are typically manufactured by molding or embossing. The disadvantages of the graphite-based plates are that the methods of making the plates are expensive, the plates lack mechanical strength, and the plates are difficult to manufacture. The weak mechanical properties of graphite bi-polar plates require thicker plates vs. metallic plates, which results in an increase of the overall size of the fuel cell. In addition, thermal and electrical conductivity of graphite bi-polar plates are inferior to the thermal and electrical conductivity of metallic bi-polar plates, resulting in additional electric losses and overheating.

SUMMARY OF THE INVENTION

Briefly stated, a conductive, corrosion-resistant coating includes a mixture of corrosion-resistant binder and highly conductive corrosion-resistant particles. The size of the particles is equal to or greater than the final thickness of the coating. After the coating is applied and cured, the surface of the coating is machined to remove the top surface layer of the binder as well as the top parts of the particles embedded in the binder, thus opening multiple direct conductive paths to the underlying substrate through the conductive particles.

According to an embodiment of the invention, a method for making an electrically conductive, corrosion-resistant coating includes the steps of (a) providing a substrate to be coated; (b) forming a mixture of a binder compound and a plurality of conductive particles; (c) coating the substrate with the mixture; (d) curing the mixture on the substrate, thus forming a coating having an initial thickness, a bottom surface which is in contact with the substrate, and a top surface which is not in contact with the substrate; and (e) removing a layer of the coating from the top surface of the coating, therein exposing at least a portion of the conductive particles on the top surface of the coating, wherein at least some of the conductive particles are exposed on the top surface of the coating and are simultaneously touching the substrate on the bottom surface of the coating; thus forming the electrically conductive, corrosion-resistant coating of a final thickness.

According to an embodiment of the present invention, an electrically conductive, corrosion-resistant coating on a substrate includes a layer of a cured mixture of a binder compound and a plurality of conductive particles, with the mixture coated on the substrate, whereas at least a portion of the conductive particles on the top surface of the coating are directly exposed and simultaneously are in contact with the substrate on the bottom surface of the coating.

The present invention overcomes the corrosion and conductivity problems by providing a conductive, non-corroding coating rendering bi-polar plates in fuel cells corrosion-resistant. Use of such coating will enable the use of inexpensive, light, thermally conductive metals (for example aluminum-based), or inexpensive steel-based, bi-polar plates, which cannot currently be used due to extensive corrosion, or because of the prohibitively expensive anti-corrosion coating required. Low cost metallic materials, including steel, aluminum, and aluminum alloys can be employed in bi-polar plates with the present coating. According to an embodiment of the invention, the surface of the substrate to be protected is covered by a coating which is a composite of a generally non-conductive and corrosion-resistant binder, adhesive, sealant, or paint, and highly conductive and corrosion-resistant particles. The size of the particles is equal to or greater than the final thickness of the coating. After the coating is applied and cured (hardened), the surface of the coating is polished, machined, or grinded, to remove the top surface layer of the binder and particles embedded in the binder, thus opening multiple direct conductive paths to the underlying substrate through the conductive particles. By preventing the corrosive media from contact with the substrate, the coating provides corrosion protection of the substrate. At the same time, high electric conductivity of the coating is ensured by the conductive particles which are in direct contact with the substrate and are exposed on the surface of the coating, with electric current going directly through the particles from the surface of the coating to the substrate.

DETAILED DESCRIPTION OF THE PREFERRED EMBODIMENT

Figure 1:
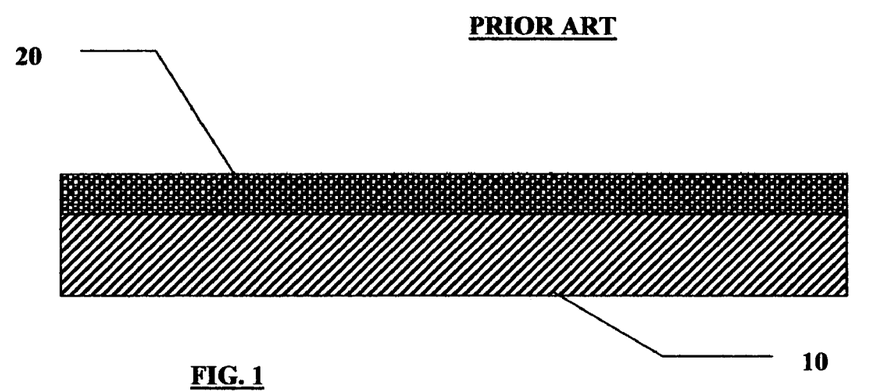
FIG. 1 shows a cross-section of a typical composite conductive coating according to the prior art.

Referring now to the drawings, in which like reference numerals refer to like parts throughout, FIG. 1 illustrates a cross-section of a typical prior art composite conductive coating 20, including a mixture of a binder and a fine conductive powder on a substrate 10.

Figure 2:
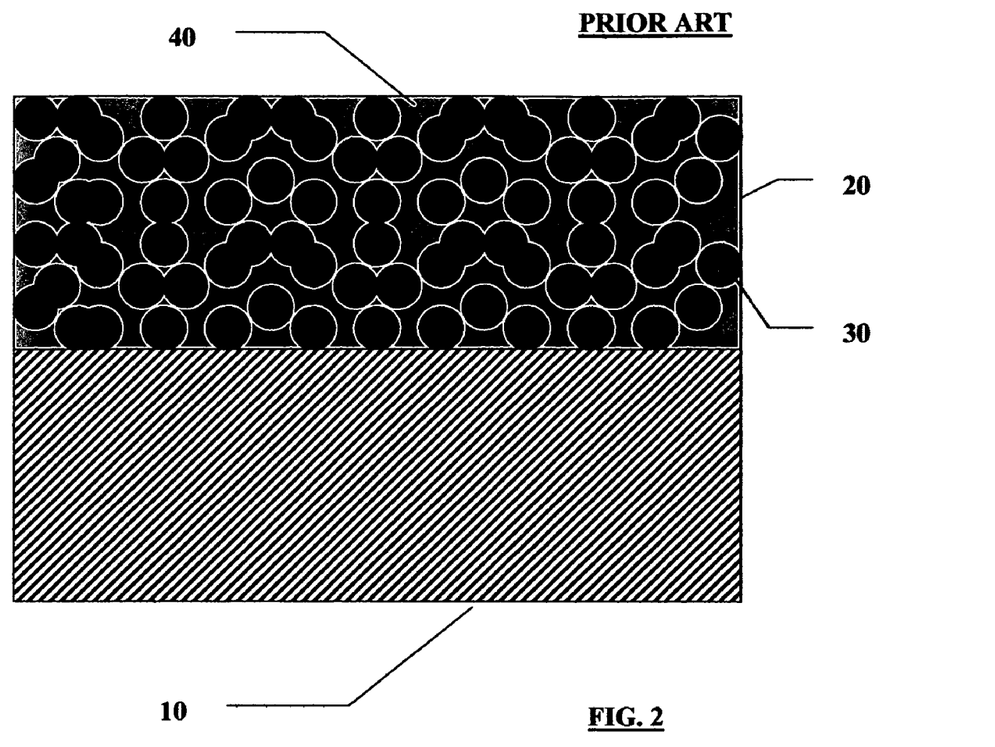
FIG. 2 shows a magnified area of a cross-section of a typical composite conductive coating according to the prior art.

Referring to FIG. 2, a magnified area of a cross-section of prior art conductive coating on a substrate shown in FIG. 1 is shown, with a plurality of conductive particles 30 dispersed in the binder 40. It can be appreciated that the conductive path from the surface of the coating 20 to the substrate is a tortuous path from particle to particle and in some cases between particles, through the non-conductive binder. Thus the coating has insufficient conductivity. This results in poor overall conductivity of the bi-polar plate and increased ohmic losses in the fuel cell. In order to increase conductivity of such prior art coatings, the loading of the conductive powder should be as high as possible, which results in poor coating properties, especially poor corrosion resistance. On the other hand, improving coating properties such as viscosity, adhesion, delaminantion, cracking, thermal cycling resistance, and anti-corrosive properties requires higher concentrations of the binder in the coating, which results in poor conductivity of the coating.

Figure 3:
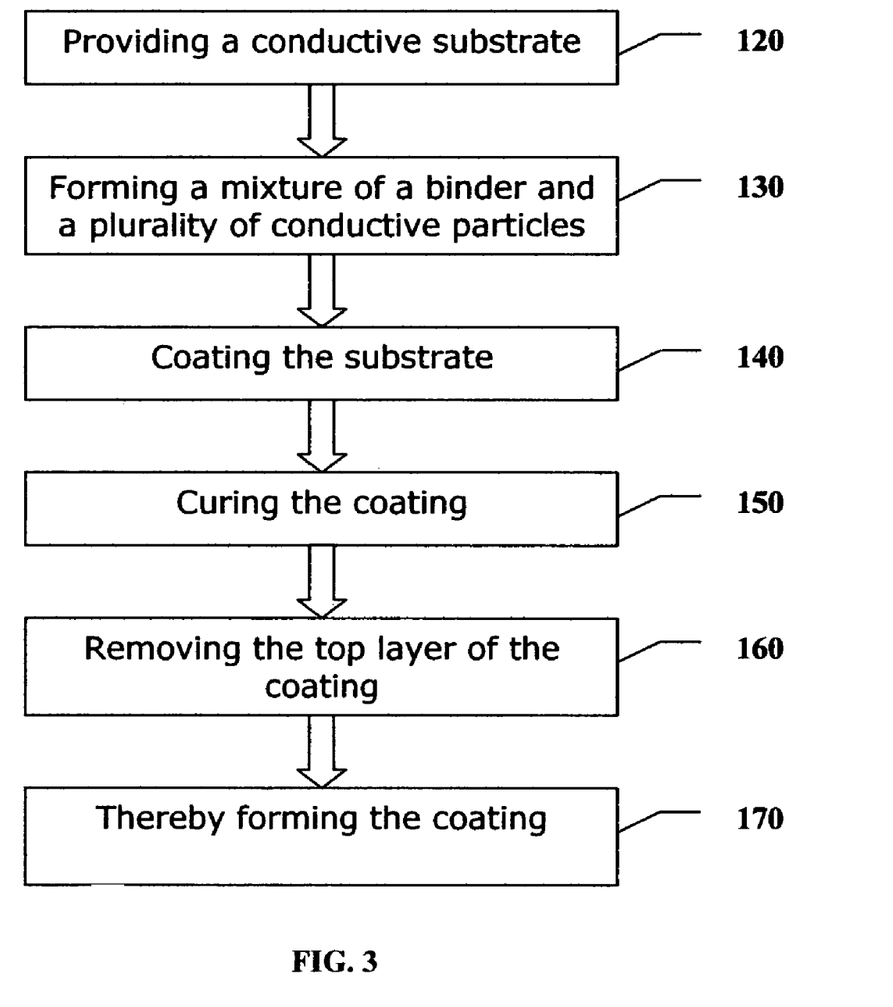
FIG. 3 shows a flow chart of the process of applying the coating according to the present invention.

Referring now to FIG. 3, a flow chart of the process of applying a conductive, corrosion-resistant coating according to an embodiment of the present invention is shown in FIG. 3. The process includes providing a substrate to be coated at step 120 after which a mixture is formed of a binder compound and conductive particles 30 at step 130. The binder is an epoxy, glue, phenolic materials, silicones, acrylic, teflon-based binders, urethane, oil-based, alkyd, chlorinated rubber, polyamide, various anti-corrosion paints, or similar. Conductive particles include any conductive material such as graphite, graphite composites, metal, and metal alloys. Preferred particles are graphite, titanium, titanium nitride, and corrosion-resistant alloys.

After the substrate is coated with the mixture at step 140; the coating is cured at step 150. After the coating is cured, a top layer of the cured coating is removed at step 160, thus forming the electrically conductive, corrosion-resistant coating at step 170.

Figure 4:
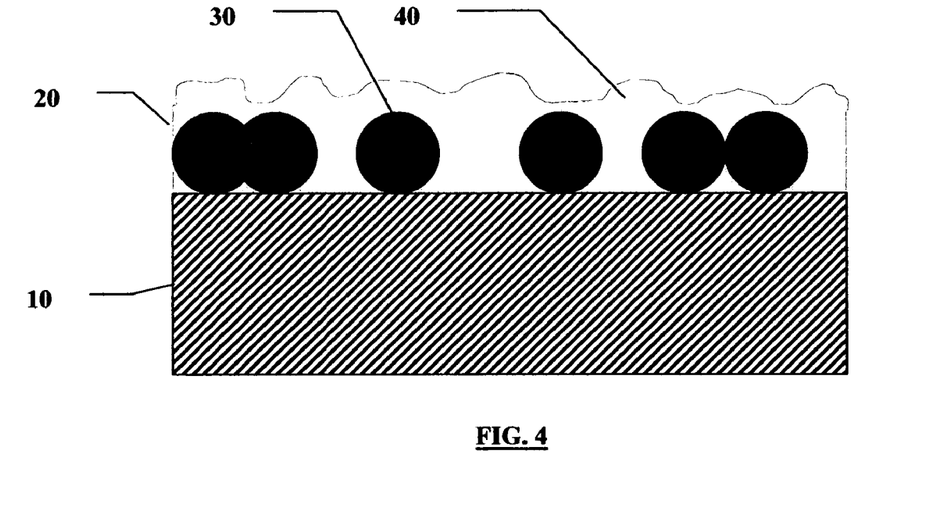
FIG. 4 is a cross-section of the conductive coating being prepared according to this invention after the curing step.

Referring now to FIG. 4, the cross-section of a conductive coating 20 being prepared according to this invention is shown. The coating is completed through step 150 of FIG. 3, with the coating 20 including a mixture of a binder 40 and a plurality of conductive particles 30 being applied on a conductive substrate 10 and cured.

Figure 5:
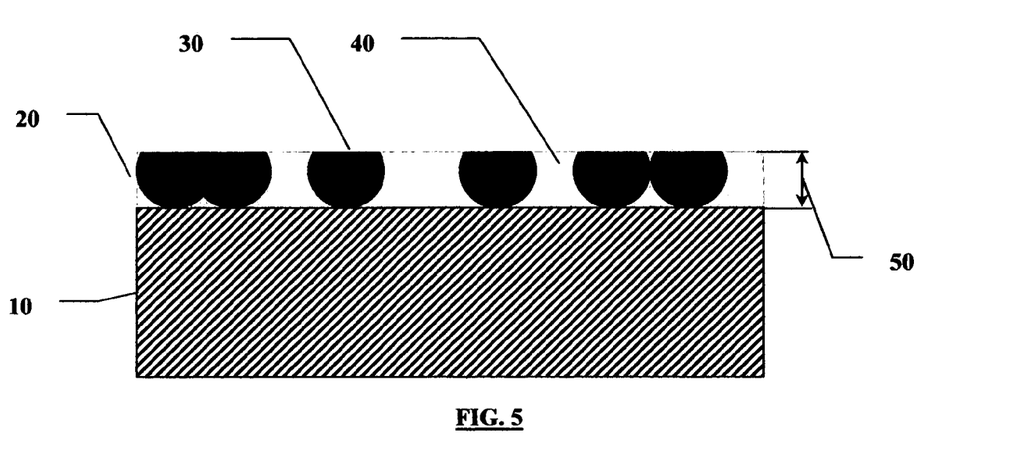
FIG. 5 is a cross-section of the conductive coating being prepared according to this invention after the polishing step.

Referring to FIG. 5, the coating made according to this invention at the end of step 160 of FIG. 3. is illustrated, the cured coating shown in FIG. 4 is further polished to remove the uppermost layer of the binder 40 and top layer of conductive particles 30, thereby resulting in a conductive coating with a final thickness 50 of the coating 20. After the coating is applied and cured, the surface of the coating is mechanically or chemical-mechanical polished, grinded, or scraped so as to remove the top layer of the cured coating. The processes of mechanically polishing, grinding or scraping of coated surfaces are known in the art. This process results in removal of the top parts of the conductive particles, thus increasing the exposed conductive area of the particles. The depth of polishing or grinding is selected so as to maximize conductivity and simultaneously maintain sufficient corrosion protection, which can be tested by accelerated corrosion testing techniques known in the art. The depth of the material removal varies from approximately 5% of the initial coating thickness to approximately 50%.

Referring now to shapes and types of conductive particles, metal particles or powder, metal spheres and flattened spheres, cut metal wire, flattened cut metal wire, graphite particles, graphite powder or graphite cut fibers, and the like, and mixtures thereof are used as conductive particles according to this invention.

In one embodiment of the invention, the conductive particles are all of similar shape and of similar dimensions. In another embodiment of this invention, the conductive particles are a mix of conductive particles varying in dimensions but all having similar shape. In yet another embodiment of the present invention, several different shapes of conductive particles are mixed together, all with different dimensions. In yet another embodiment of this invention, the conductive particles are made of different conductive materials.

Figure 6A:
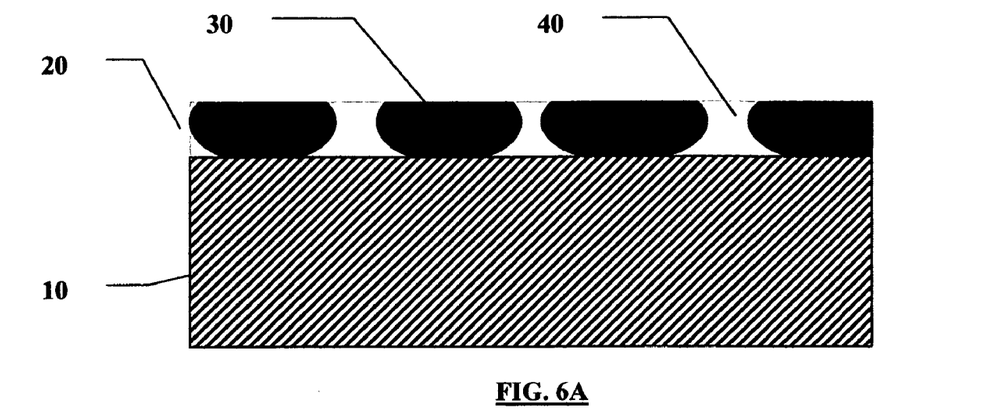
FIGS. 6A, 6B, and 6C show several further embodiments of the invention, where the conductive particles are generally non-spherical in shape, including flattened spheres, FIG. 6A, complex-shaped particles, FIG. 6B, and cut fibers or cut wire, or flattened cut wire, FIG. 6C.
Figure 6B:
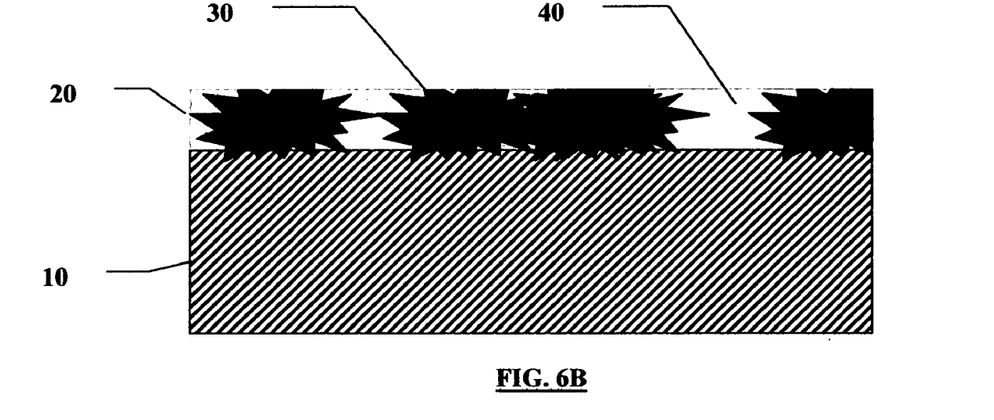
Figure 6C:
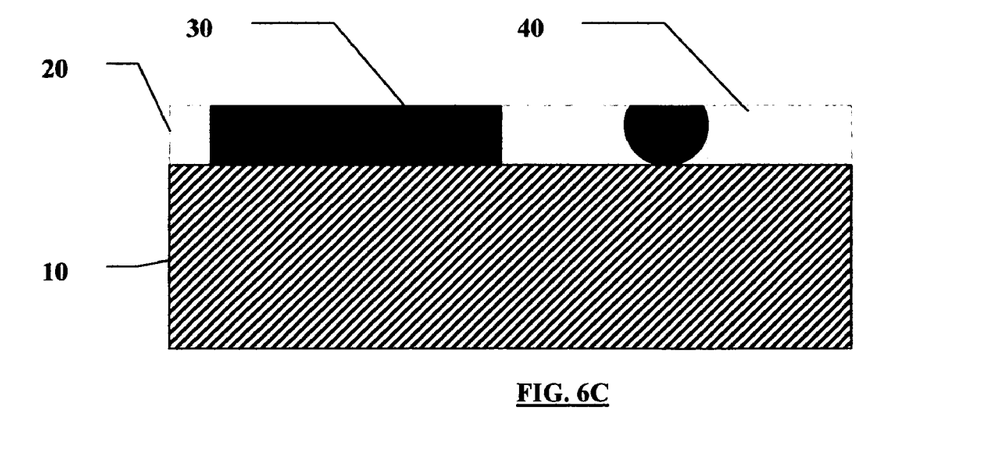

FIGS. 6A, 6B, and 6C show several further embodiments of the invention, where the conductive particles are generally non-spherical in shape, including flattened spheres, FIG. 6A, complex-shaped particles, FIG. 6B, and cut fibers or cut wire, or flattened cut wire, FIG. 6C.

Figure 7:
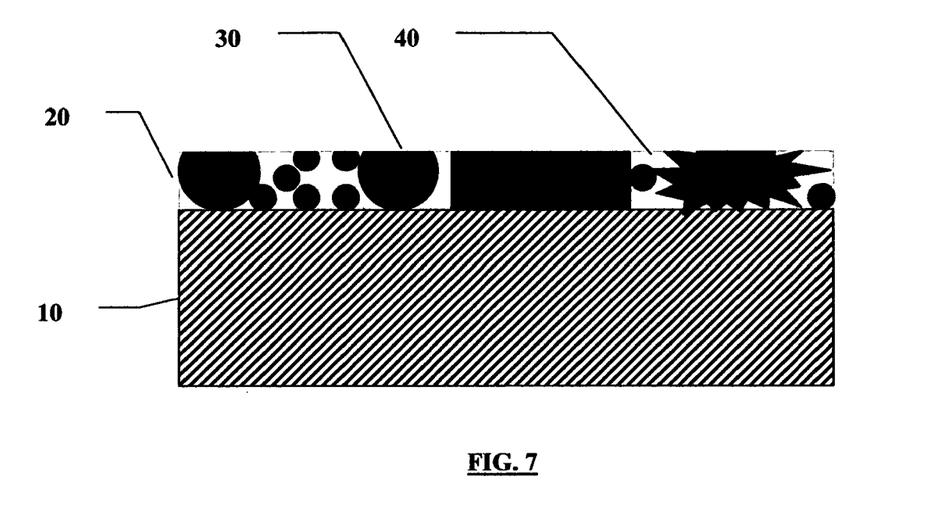
FIG. 7 is another embodiment of the present invention, showing the cross-section of the conductive coating with a combination of several types of conductive particles.

Referring now to FIG. 7, another embodiment of the present invention illustrates the conductive coating with a combination of several types of conductive particles, including spherical particles, fibers, and complex-shape particles. These particles have the smallest dimension which is equal to or greater than the final thickness of the conductive coating. Also, fine conductive particles can be present, with dimensions substantially smaller than the final thickness of the conductive coating.

Figure 8:
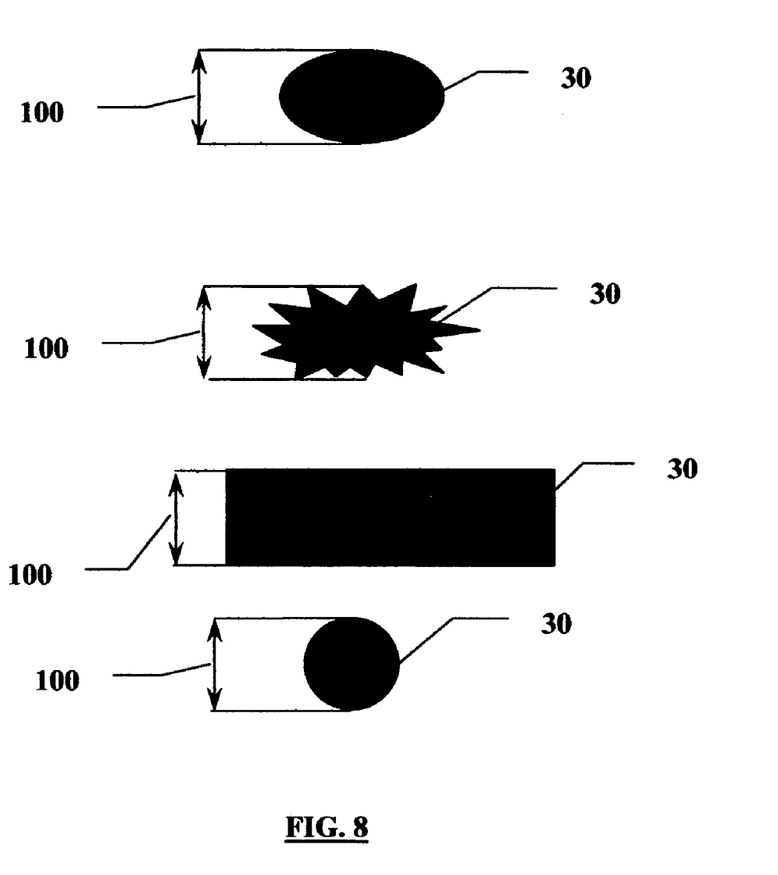
FIG. 8 illustrates the definition of the smallest dimension of the conductive particles for several types of particles.

The smallest dimension 100 of the conductive particles for several types of particles is defined by FIG. 8. The size of the conductive particles is selected so that the smallest characteristic dimension of the conductive particles 100, as seen on FIG. 8, is larger than the final thickness of the coating 50 (FIG. 5). The final thickness of the coating ranges from approximately 25 microns to approximately 2000 microns.

Figure 9:
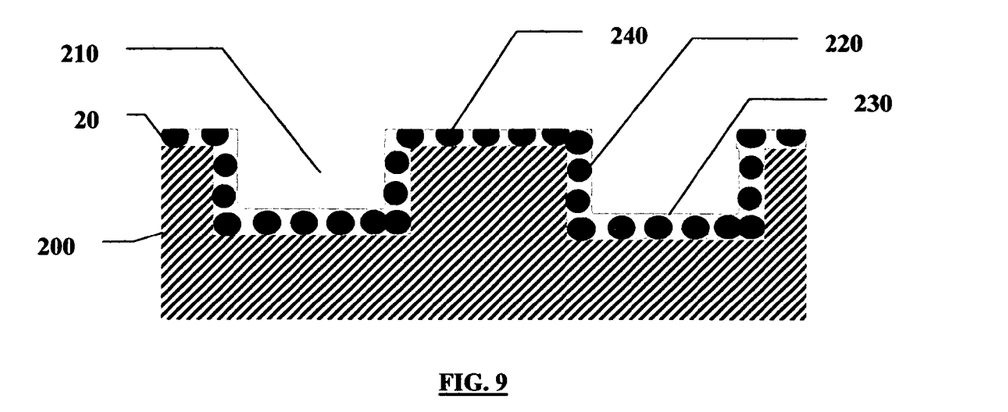
FIGS. 9 and 10 show a cross-section of a segment of a fuel cell bi-polar plate with a flow field, with the conductive coating according to the present invention.

Referring to FIG. 9, a cross-section of a section of a fuel cell bi-polar plate 200 with a flow field represented by a channel 210 for carrying fuel, oxidant, or reaction products, with the conductive coating of the present invention applied, is illustrated. The side walls 220 of the channel 210, top surface 240, as well as the bottom wall 230 of the channel 210 are all coated with the coating 20. The coating is applied uniformly to the surface 240 of the bi-polar plate, as well as to the channel wall 220 and the bottom of the channel 230. The polishing or grinding step is then used to remove the top layer of the coating. In the embodiment shown, the top layer of the conductive coating is removed only from the top surface 240 of the bi-polar plate 200, which is the area where the conductivity of the bi-polar plate is of greatest importance, as this area is in contact with Membrane-Electrode Assembly (MEA) in a fuel cell.

Figure 10:
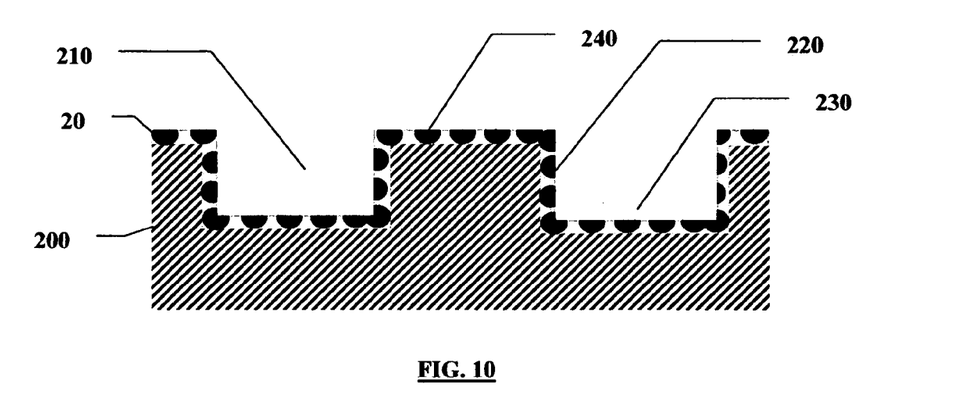

Referring now to FIG. 10, in another embodiment of the invention the top layer of the conductive coating 20 is removed from all areas including the top surface 240 of the bi-polar plate 200, the channel wall 220, and the bottom of the channel 230, as illustrated in a cross-section of a section of a fuel cell bi-polar plate 200.

The conductive coating of the present invention can be applied to substrates moving as a continuous web, with the processes of coating, curing, and polishing/machining all performed continuously and sequentially. Furthermore, the coating can be applied in a reel-to-reel process.

The foregoing description addresses embodiments encompassing the principles of the present invention. The embodiments may be modified, changed, and/or implemented using various types of arrangements. Those skilled in the art will readily recognize various modifications and changes which may be made to the invention without strictly following the exemplary embodiments and applications illustrated and described herein, and without departing from the scope of the invention which is set forth in the following claims.

What is claimed is:

1. A method of making an electrically conductive, corrosion-resistant coating comprising the steps of
   providing a conductive substrate to be coated;
   forming a mixture of a binder compound and a plurality of conductive particles;
   coating said conductive substrate with said mixture; curing said mixture on said conductive substrate, thereby forming a coating having an initial thickness, a bottom surface which is in contact with said conductive substrate, and a top surface which is not in contact with said conductive substrate;
   removing a layer of said coating from said top surface of said coating, forming an exposed conductive area on at least a portion of said conductive particles on said top surface of said coating,
   wherein at least some of said conductive particles having said exposed conductive area on said top surface of said coating are simultaneously in contact with said conductive substrate on said bottom surface of said coating with direct conductive paths to said conductive substrate formed through said conductive particles; thereby forming said electrically conductive, corrosion-resistant coating of a final thickness.

2. The method according to claim 1, wherein said conductive particles are selected from the group consisting of metal particles, cut metal wire, cut graphite fiber, graphite particles, mixture of metal particles and cut metal wire, mixture of graphite particles and cut graphite fiber, mixture of metal particles and graphite particles, mixture of cut graphite fiber and cut metal wire, mixture of metal particles and cut graphite fiber, mixture of cut metal wire and graphite particles, mixture of metal particles, graphite particles, and cut metal wire, mixture of metal particles, graphite particles, and cut graphite fiber, mixture of metal particles, cut graphite fiber, and cut metal wire, mixture of graphite particles, cut graphite fiber, and cut metal wire, and mixture of graphite particles, metal particles, cut graphite fiber, and cut metal wire.

3. The method according to claim 2, wherein from about 5% to exactly 100% of said conductive particles have a smallest dimension which is equal to or greater than said final thickness of said coating.

4. The method according to claim 3, wherein said final thickness of said coating ranges from about 25 microns to about 2000 microns.

5. The method according to claim 4, wherein said step of removing removes from about 5% to about 50% of said initial thickness of said coating.

6. The method according to claim 4, wherein said conductive substrate is a bi-polar plate of a fuel cell.

7. The method according to claim 3, wherein said conductive substrate is a bi-polar plate of a fuel cell.

8. The method according to claim 1, wherein from about 5% to exactly 100% of said conductive particles have a smallest dimension which is equal to or greater than said final thickness of said coating.

9. The method according to claim 8, wherein said final thickness of said coating ranges from about 25 microns to about 2000 microns.

10. The method according to claim 9, wherein said step of removing removes from about 5% to about 50% of said initial thickness of said coating.

11. The method according to claim 9, wherein said conductive substrate is a bi-polar plate of a fuel cell.

12. The method according to claim 8, wherein said conductive substrate is a bi-polar plate of a fuel cell.

13. The method according to claim 1, wherein said step of removing removes from about 5% to about 50% of said initial thickness of said coating.

14. The method according to claim 13, wherein said conductive substrate is a bi-polar plate of a fuel cell.

15. The method according to claim 1, wherein said conductive substrate is a bi-polar plate of a fuel cell.

16. An electrically conductive, corrosion-resistant coating on a conductive substrate, comprising:
   a layer of a cured mixture of a binder compound and a plurality of conductive particles, said mixture being coated on said conductive substrate,
   said coating having a bottom surface which is in contact with said conductive substrate, and a top surface which is not in contact with said conductive substrate;
   wherein at least a portion of said conductive particles on said top surface of said coating is directly exposed by a removal of a layer of said coating from said lop surface forming an exposed conductive area on said portion of said conductive particles,
   wherein at least some of said conductive particles of said portion simultaneously are in contact with said conductive substrate on said bottom surface of said coating, with direct conductive paths to said conductive substrate formed through said conductive particles.

17. An electrically conductive, corrosion-resistant coating according to claim 16, wherein said conductive substrate is a bi-polar plate, a flow-field component of a fuel cell, or a bi-polar plate with flow field channels.

18. An electrically conductive, corrosion-resistant coating according to claim 16, wherein from about 5% to exactly 100% of said conductive particles have a smallest dimension which is equal to or greater than a final thickness of said coating, and wherein the final thickness of said coating ranges from about 25 microns to about 2000 microns.

19. An electrically conductive, corrosion-resistant coating on a conductive substrate, said coating comprising:
   means for conducting electricity from a top surface of said coating to said conductive substrate;
   means for sealing said conductive substrate from corrosion;
   wherein said means for conducting electricity is interspersed among said means for sealing said conductive substrate;
   and wherein at least a portion of said means for conducting electricity is directly exposed on said top surface of said coating by removing a layer of said coating from said top surface of said coating forming an exposed conductive area on said portion of said means for conducting electricity,
   wherein at least some of said portion of said means for conducting electricity are simultaneously in contact with said conductive substrate with direct conductive paths to said conductive substrate formed through said means for conducting electricity.

20. An electrically conductive, corrosion-resistant coating according to claim 19, wherein said conductive substrate is a bi-polar plate of a fuel cell, a flow-field component of a fuel cell, or a bi-polar plate of a fuel cell with flow field channels.

* * * * *